March 29, 1949.  M. E. GLUHAREFF  2,465,681
HELICOPTER ROTOR
Filed Sept. 26, 1944
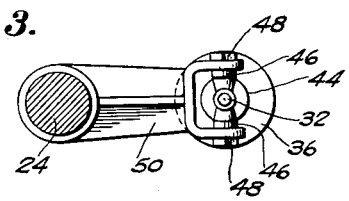
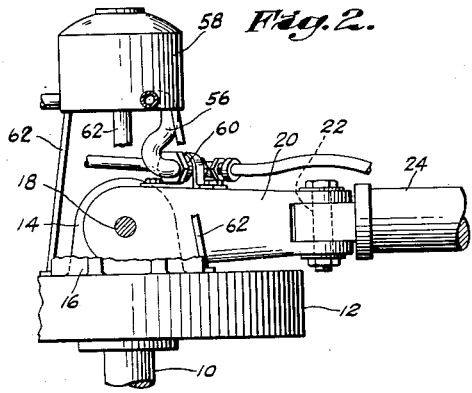
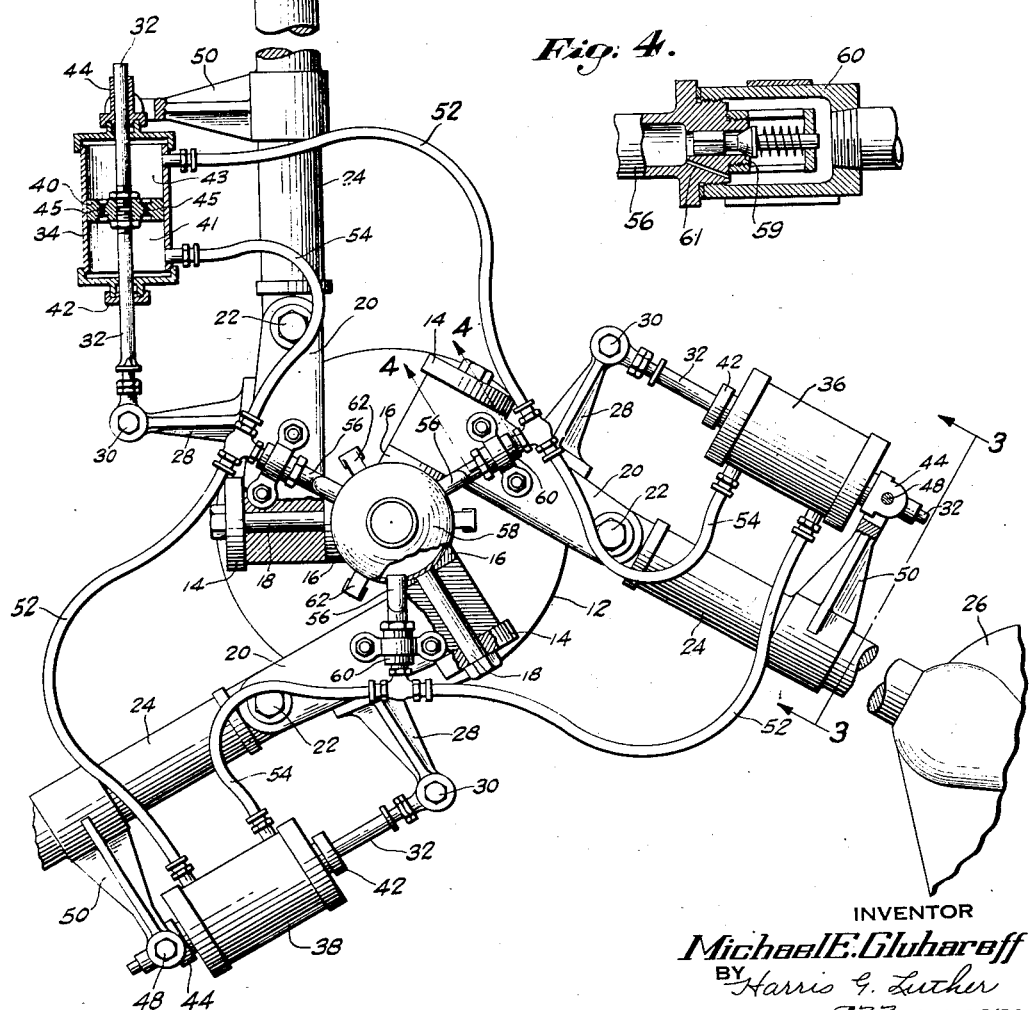
INVENTOR
Michael E. Gluhareff
BY Harris G. Luther
Attorney Patented Mar. 29, 1949

2,465,681

UNITED STATES PATENT OFFICE.

2,465,681

HELICOPTER ROTOR

Michael E. Gluhareff, Stratford, Conn., assignor to United Aircraft Corporation, East Hartford, Conn., a corporation of Delaware Application September 26, 1944, Serial No. 555,817

4 Claims. (Cl. 170—160.55)

This invention relates to helicopters and more particularly to means for maintaining the several blades of a helicopter rotor in substantially symmetrical arrangement.

An object of the invention is the provision of hydraulic mechanism associated with the rotor blades of a helicopter to maintain the symmetrical arrangement of those blades.

Another object is to provide, in a helicopter having rotor blades hinged to a common axis for flapping movements and having drag hinges, mechanism for maintaining the symmetrical arrangement of the blade about their drag hinges.

Other objects and advantages will be apparent from the specification and claims, and from the accompanying drawing which illustrates what is now considered to be a preferred embodiment of the invention.

In the drawing,

Fig. 1 is a top elevation of the hub portion of a helicopter sustaining rotor.

Fig. 2 is a side elevation with portions broken away of a portion of the helicopter of Fig. 1.

Fig. 3 is a detail showing an end view of the hydraulic cylinder and the connections thereto, and Fig. 4 is a detail showing a section through the check valve.

The rotor hub is mounted on the upper end of shaft 10 which projects upwardly from the helicopter body (not shown) and the rotor may be driven in the usual manner by an engine supported in the helicopter body or by any other suitable means such as jet propulsion. The rotor hub comprises a disc 12, carried on the upper end of shaft 10. Bosses 14 and 16 are formed integral with the disc 12 and project upwardly therefrom. These bosses are apertured to receive a pin 18 which forms the pin of the rotor-blade flapping-hinge. A link 20 is pivoted on pin 18 and extends outwardly from the rotor hub. The link 20 carries a pin 22 at its outer end. Pin 22 passes through one end of blade shank 24 and thus forms the pin of the drag hinge of the rotor blades. Rotor blades 26 are mounted on the other end of the blade shank 24.

A bracket 28 is mounted on each of the drag links 20 and, at its outer end carries a pivot 30 connecting it to a piston rod 32. The piston rods pass through cylinders indicated as 34, 36, and 38 and each piston rod carries a piston 40 dividing its associated cylinder into an inboard chamber 41 and an outboard chamber 43. Each piston 40 is provided with one or more restricted orifices 45 connecting the chambers 41 and 43. Each cylinder is provided with a stuffing box 42 at one end thereof, and a stuffing box 44 at the other end thereof. Stuffing box 44 has lugs 46 which receive pins 48 to pivotally connect the cylinders 34, 36, and 38 with brackets 50, fixed on blade shanks 24.

The outboard chamber of each cylinder is connected to the inboard chamber of an adjacent cylinder. In the device illustrated outboard chamber 43 of cylinder 34 is connected by means of flexible pipes 52 and 54 to the inboard chamber of cylinder 36 and, likewise, outboard chamber of cylinder 36 is connected by means of pipes 52 and 54 to the inboard chamber of cylinder 38, and outboard chamber of cylinder 38 is connected to the inboard chamber 41 of cylinder 34.

The pipes 52 and 54 are joined together to form the connections between the cylinders and are supported at the joint on the link 20. A branch connection 56 is connected with the pipes 52 and 54 at the joint and leads to a reservoir 58 containing make-up oil for the chambers in the hydraulic cylinders 34, 36, and 38. A check valve, generally indicated at 60 in the line 56, allows oil to flow from the reservoir to the chambers in the cylinders but prevents return of oil from the cylinders to the reservoir. The reservoir is supported on the hub 12 by support 62. If desired, the valve 59 of the check valve 60 may be provided with or replaced by a small orifice 61 to allow for oil expansion due to temperature.

As shown in Fig. 1, the rotor blades are symmetrically arranged about the hub 12, each being spaced 120° from the others. Movement of any blade about its drag hinge 22 will destroy this symmetrical arrangement and tend to unbalance the rotor by placing more weight on one side of shaft 10 than on the other. In the construction shown, however, if one blade, say the blade shown on the top of the sheet, attempts to move forward, i. e., to the left, on its drag hinge, it will move its cylinder 34 down relative to the piston 40 and reduce the size of chamber 43, this will force oil out of the chamber 43 through pipes 52 and 54 to the inboard chamber of cylinder 36, thus moving cylinder 36 to the left and advancing its associated blade to the same extent that the blade associated with cylinder 34 advanced. This action, in turn, forces oil into the inboard chamber of cylinder 38 and, likewise, advances its associated blade. Hence, any attempt of one of the blades to move out of the symmetrical arrangement causes each of the other blades to move in the same direction and substantially an equal distance. This action is the same for movement of the blades in either direction about the drag hinge 22 and the practical incompressibility of oil assures substantially equal movements of the blades. A slight amount of flexibility is permitted by resilience of the connecting lines, and by restricted orifices 45 in the pistons 46 which give the pistons some shock-absorber characteristics. This shock-absorber characteristic permits small amounts of relatively slow movement of one blade with respect to the others such as normally occurs in the rotation of the blade due to differences in drag of the blade as it rotates but acts to prevent any sudden large movement of one blade relative to the others such as otherwise might be caused by sudden gusts or by a hard sidewise landing. The restricted orifices 45 also permit the return of the blades to a symmetrical pattern after that pattern may have been temporarily disturbed. When orifices 61 are utilized, the orifices 45 may, if desired, be omitted.

From the above it will be appreciated that I have provided a structure which will permit small amounts of relative movement of the blade of a rotor but which, at the same time, acts to maintain the symmetrical arrangement of the blades and prevents any sudden disarrangement of the blade pattern.

It is to be understood that the invention is not limited to the specific embodiment herein illustrated and described, but may be used in other ways without departure from its spirit as defined by the following claims.

I claim:

1. Means connecting the several blades of a multibladed rotating wing to synchronize movements thereof comprising, a pivot for each blade connecting said blade to a common support, a shock absorber comprising an expansible and contractible chamber device having two separate chambers, connected across each pivot, one chamber expanding and the other contracting when the blade moves about its pivot, a restricted orifice connecting said chambers, and hydraulic means connecting said one chamber of each device with the other chamber of the next device.

2. In combination with a helicopter rotor having symmetrically spaced blades mounted on drag hinges, a shock absorbing expansible chamber device mounted across each said drag hinge and actuated by movement of its associated blade about said hinge, each said device comprising a pair of expansible and contractible chambers connected by a restricted orifice, one of which expands as the other contracts, hydraulic means connecting said one chamber of one device with said other chamber of an adjacent device, and hydraulic means connecting said other chamber of said one device with said one chamber of an adjacent device so that movement of the blade associated with said one device will cause substantially equal movement of the adjacent blades.

3. In a helicopter rotor having movable blades, means for moving one blade by movement of an adjacent blade comprising, interconnected hydraulic expansible chamber devices each including a pair of expansible and contractible chambers, one device being operatively connected with each blade and actuated by movement of its associated blades whereby one chamber expands while the other chamber contracts, hydraulic means interconnecting the devices of adjacent blades, so that expansion of one of the chambers of one device causes substantially equal expansion of the other chamber of the adjacent device, a fluid reservoir connected with each interconnecting means for supplying additional fluid to keep the expansible chambers full of fluid and a restricted orifice in each connection to the reservoir.

4. In combination with a helicopter rotor having symmetrically spaced blades mounted on drag hinges, a shock absorbing device mounted across each of said drag hinges including a hydraulic cylinder pivotally connected to each of said blades for limited movement in the plane of rotation thereof and a cooperating piston having a connection to said rotor which is fixed in the plane of rotation of said blade, each cylinder and piston forming a pair of expansible and contractible chambers, one of which expands as the other contracts, damper means comprising a restricted orifice connecting the chambers of each device, means interconnecting said one chamber of each device with the other chamber of the next device, and a liquid reservoir mounted centrally of said hub including articulating connections to each of said interconnecting means.

MICHAEL E. GLUHAREFF.

REFERENCES CITED

The following references are of record in the file of this patent:

UNITED STATES PATENTS

| Number | Name | Date |
|---|---|---|
| 1,211,272 | Anderson | Jan. 2, 1917 |
| 1,899,086 | Larsen | Feb. 28, 1933 |
| 1,928,816 | Grayson | Oct. 3, 1933 |
| 1,948,458 | Cierva | Feb. 20, 1934 |
| 2,115,754 | Vaughn | May 3, 1938 |
| 2,139,982 | Smith | Dec. 13, 1938 |
| 2,229,058 | Dicks | Jan. 21, 1941 |
| 2,330,842 | Pullin | Oct. 5, 1943 |